(12) United States Patent
Matsushita

(10) Patent No.: US 7,445,358 B2
(45) Date of Patent: Nov. 4, 2008

(54) LIGHT GUIDE PLATE AND A PLANAR LIGHTING DEVICE USING THE SAME

(75) Inventor: Motohiko Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 145 days.

(21) Appl. No.: 11/645,781

(22) Filed: Dec. 27, 2006

(65) Prior Publication Data

US 2007/0147759 A1    Jun. 28, 2007

(30) Foreign Application Priority Data

Dec. 27, 2005    (JP) .............................. 2005-375760

(51) Int. Cl.
  *F21V 7/04* (2006.01)
  *F21V 5/00* (2006.01)
(52) U.S. Cl. ................. 362/330; 362/224; 362/614; 362/615; 362/628; 362/629
(58) Field of Classification Search ................. 362/330, 362/224, 225, 223, 559, 26, 27, 600–629; 349/62, 63, 65, 70
  See application file for complete search history.

(56) References Cited

U.S. PATENT DOCUMENTS 6,709,122 B2 * 3/2004 Adachi et al. ................. 362/27
6,883,950 B2 * 4/2005 Adachi et al. ................ 362/555
2003/0202363 A1 * 10/2003 Adachi et al. ................ 362/558

FOREIGN PATENT DOCUMENTS

| JP | 8-062426 A | 3/1996 |
| JP | 9-304623 A | 11/1997 |
| JP | 10-133027 A | 5/1998 |
| JP | 2005-234397 A | 9/2005 |
| WO | WO 2005/080863 A2 | 9/2005 |

* cited by examiner

*Primary Examiner*—Bao Q Truong
(74) *Attorney, Agent, or Firm*—Sughrue Mion, PLLC (57) ABSTRACT

A light guide plate of the invention has a plurality of unit light guide plates that are formed of a transparent resin material and which are joined together. Each of the unit light guide plates has a flat rectangular light exit surface and a back surface that is opposite the light exit surface and which has a parallel groove formed in generally a center and parallel to a side of the rectangular light exit surface. The light guide plate is used with a linear light source fitted in the parallel groove, satisfying the inequality $(L_0/280)^2 \cdot k(14T^2+710T) \cdot (-0.65 \log S+1.9) \leq 10$, where $L_0$ is the length (mm) of the light guide plate, k is the linear expansion coefficient [/° C.] of the resin material, Ts is the surface temperature [° C.] of the linear light source that has become stable, S is half of the cross-sectional area [mm$^2$] of the unit light guide plate as it is cut through a plane perpendicular to the parallel groove, and $T=Ts-25$.

5 Claims, 10 Drawing Sheets

LIGHT GUIDE PLATE AND A PLANAR LIGHTING DEVICE USING THE SAME

The entire contents of the documents cited in this specification are incorporated herein by reference.

BACKGROUND OF THE INVENTION

The present invention relates to a transparent light guide plate that diffuses light from a linear light source in a direction of plane so that uniform illuminating light emerges from a light exit surface, as well as a planar lighting device using the same.

A liquid crystal display device is provided with a backlight unit for irradiating a liquid crystal panel (LCD) with light from its rear side and illuminating the liquid crystal panel. A known backlight unit is one that uses a flat plate of transparent resin as a light guide plate for converting light from a light source into planar light. The backlight unit using such light guide plate usually comprises an illuminating light source, a light guide plate that diffuses light emitted from the light source to irradiate the liquid crystal panel, a prism sheet or diffusion sheet for causing uniform light to be emitted from the light guide plate and other components.

Recent years are seeing demands for reducing the thickness and power consumption of liquid crystal display devices and to meet such demands, light guide plates of various shapes have been proposed. (See, for example, JP 9-304623 A, JP 8-62426 A, and JP 10-133027 A.)

Figure 15:
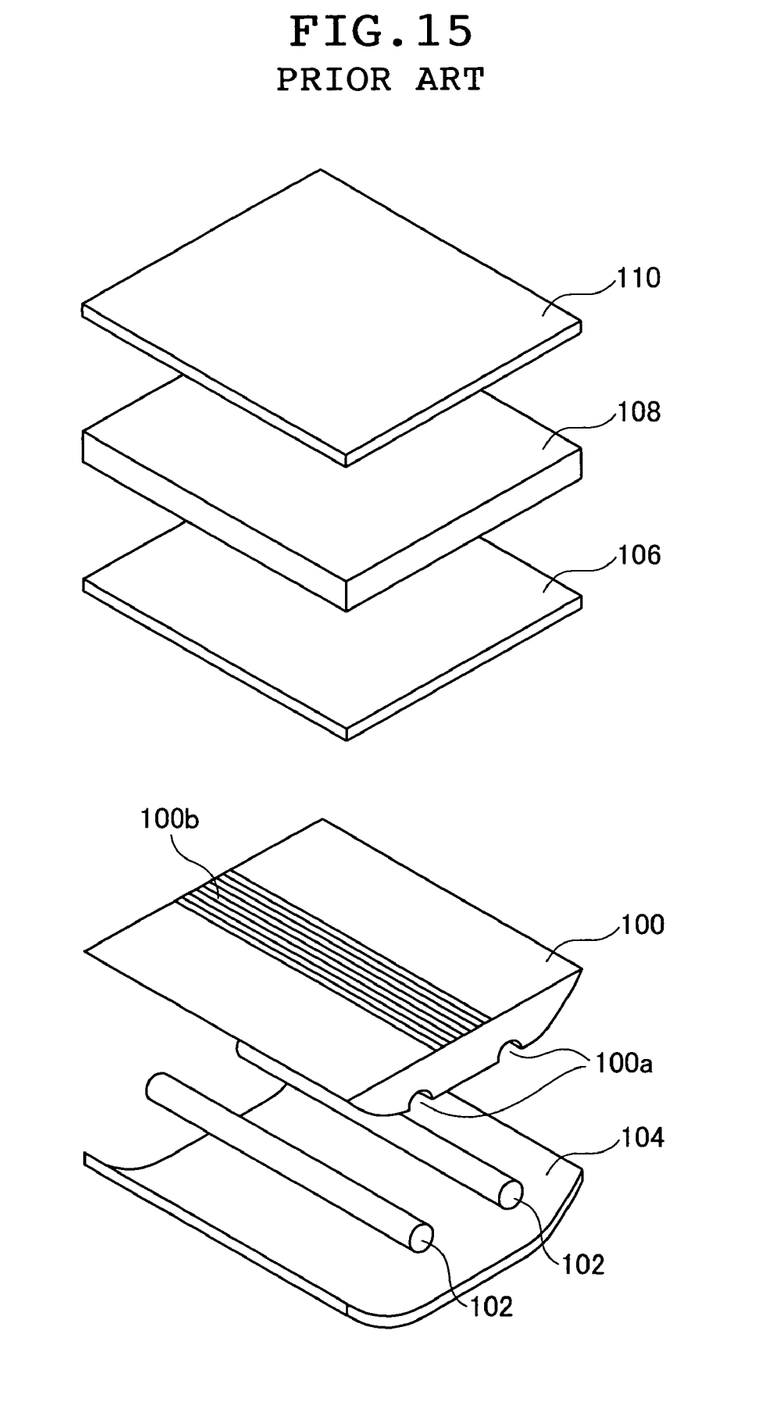
FIG. 15 is an exploded perspective view of an area light source device having a conventional light guide plate.

FIG. 15 is a schematic sectional view of the area light source device disclosed in JP 9-304623 A.

The area light source device (backlight unit) shown in FIG. 15 is formed by embedding a fluorescent lamp 102 in a light guide plate 100, then arranging a reflective sheet 104 on a rear surface of the light guide plate 100 and laminating a transmitted light amount correction sheet 106, a light diffuser 108, and a prism sheet 110 on a light exit surface of the light guide plate 100.

The light guide plate 100 has a substantially rectangular shape and is made of a resin into which fine particles functioning to diffuse illuminating light are dispersed. Also, the light guide plate 100 has a flat upper surface, which is used as the light exit surface. Further, grooves 100a each having a U shape in section are formed in the rear surface (surface opposite to the light exit surface) of the light guide plate 100. The fluorescent lamp 102 is fitted into each groove. A light amount correction surface 100b for promoting the emission of illuminating light is formed on the light exit surface of the light guide plate 100, except in portions just above the fluorescent lamps 102.

As mentioned above, JP 9-304623 A describes that, the fine particles are mixed into the resin to form the light guide plate 100 and in addition, the illuminating light is promoted to exit by the light amount correction surface 100b formed on a part or all of the light exit surface except in the portions just above the fluorescent lamps 102, thus making it possible to reduce the total thickness of the plate and the unnatural unevenness in luminance of the light emitted from the light guide plate 100.

For the purpose of obtaining a backlight for a liquid crystal display device that enables reduction in size, weight, and thickness of the liquid crystal display device as well as reduction in cost and power consumption without reducing the illumination amount of the backlight, JP 8-62426 A describes a light guide plate having a rectangular illumination surface, a groove rectangular in section which is gouged out at a central portion with respect to the short sides in parallel with the long sides and in which a light source is inserted, and a rear surface formed such that a plate thickness is gradually reduced from the groove toward both lateral surfaces on the long sides.

In addition, for the purpose of obtaining a backlight unit that enables a thin frame and reduction of the total thickness of a liquid crystal display device and which is bright with high use efficiency, JP 10-133027 A describes a light guide member (light guide plate) having a parabolic shape in section along the width direction of a concave portion where the light source is arranged, with the depth direction being a major axis.

However, planar lighting devices that use the light guide plates described in JP 9-304623 A, JP 8-62426 A and JP 10-133027 A produce an uneven profile of brightness across the light exit surface and, what is more, the utilization of light is so poor that it has been impossible for the light exit surface to emit uniform and bright light.

Under the circumstances, the assignee of the present invention filed JP 2005-234397 A, disclosing a transparent light guide plate. The plate comprises a rectangular light exit surface, a thick portion, thin edge portions, a parallel groove which accommodates a bar-like light source and inclined rear portions. The thick portion is positioned at substantially a central portion of the rectangular light exit surface in parallel with a side of the rectangular light exit surface. The thin edge portions are formed in parallel with the thick portion and the parallel grove is formed substantially at a center of the thick portion in parallel with the side of the rectangular light exit surface. The inclined rear portions are symmetrical with respect to a plane including a central axis of the bar-like light source and perpendicular to the rectangular light exit surface, and whose thickness is reduced from the thick portion toward the thin edge portions in a direction perpendicular to the side to thereby form inclined rear surfaces on both sides of the parallel groove. In the plate, an end portion of the parallel groove is narrowed toward the rectangular light exit surface symmetrically with respect to a center line of the parallel groove perpendicular to the rectangular light exit surface in a sectional shape of the parallel groove in the direction perpendicular to the rectangular light exit surface, in accordance with a ratio of a peak value of illuminance or luminance of emitted light from the bar-like light source to an average value of the illuminance or luminance of the emitted light at second portions corresponding to the inclined rear portions. The bar-like light source is accommodated in the parallel groove at a first portion of the rectangular light exit surface corresponding to the parallel groove. Having this structure, the light guide plate is thin and lightweight and features sufficiently good light utilization (high efficiency in light issuance) to emit more uniform, less uneven and brighter light from a light exit surface.

SUMMARY OF THE INVENTION

When the linear light sources fitted in the grooves formed on the rear side of the light guide plate in the planar lighting device are turned on, the heat generated from the linear light sources causes the bottom surface of the light guide plate to become hotter than the top surface, thus creating a temperature difference between the two surfaces. As a result, the two surfaces of the light guide plate thermally expand in different amounts and an internal stress is created in the light guide plate, causing it to become warped. The warpage of the light guide plate distorts its light exit surface, so the illuminating light from the planar lighting device becomes uneven in brightness or its average brightness will drop.

The present invention has been accomplished in order to eliminate these disadvantages and has as an object providing a light guide plate that is suppressed in the amount of warpage that might be caused by the heat generated from the linear light sources fitted in the grooves formed in the light guide plate.

Another object of the present invention is to provide a planar lighting device that prevents or suppresses the occurrence of warpage in a light guide plate due to the heat generated from the linear light sources fitted in the grooves formed in the light guide plate and which as a result can emit uniform illuminating light with reduced unevenness in brightness.

In order to attain the first object described above, the first mode of the present invention provides a light guide plate comprising a plurality of unit light guide plates that are formed of a transparent resin material and which are joined together, each of the unit light guide plates having a flat rectangular light exit surface and a back surface that is opposite the light exit surface and which has a parallel groove formed in generally a center and parallel to a side of the rectangular light exit surface, the light guide plate being used with a linear light source fitted in the parallel groove and satisfying the inequality:

$$(L_0/280)^2 \cdot k(14T^2+710T) \cdot (-0.65 \log S+1.9) \leq 10$$

where $L_0$ is the length (mm) of the light guide plate in a direction perpendicular to the parallel groove, k is the linear expansion coefficient [/° C.] of the resin material, Ts is the surface temperature [° C.] of the linear light source that has become stable after being lit, S is half of the cross-sectional area [mm$^2$] of the unit light guide plate as it is cut through a plane perpendicular to the parallel groove, and T=Ts−25.

In a preferred embodiment of the light guide plate according to the first mode of the present invention, the back surface of the unit light guide plate is composed of a pair of inclined faces that are symmetrical with respect to the central parallel groove and the pair of inclined faces are inclined such that the thickness of the unit light guide plate gradually decreases with the increasing distance from the parallel groove toward an end of the unit light guide plate. In another preferred embodiment, the pair of inclined faces are formed of a curved plane.

In order to attain the second object described above, the second mode of the present invention provides a planar lighting device comprising a light guide plate comprising a plurality of unit light guide plates that are formed of a transparent resin material and which are joined together, each of the unit light guide plates having a flat rectangular light exit surface and a back surface that is opposite the light exit surface and which has a parallel groove formed in generally a center and parallel to a side of the rectangular light exit surface, and a linear light source fitted in the parallel groove in the light guide plate, the planar lighting device satisfying the inequality:

$$(L_0/280)^2 \cdot k(14T^2+710T) \cdot (-0.65 \log S+1.9) \leq 10$$

where $L_0$ is the length (mm) of the light guide plate in a direction perpendicular to the parallel groove, k is the linear expansion coefficient [/° C.] of the resin material, Ts is the surface temperature [° C.] of the linear light source that has become stable after being lit, S is half of the cross-sectional area [mm$^2$] of the unit light guide plate as it is cut through a plane perpendicular to the parallel groove, and T=Ts−25.

In a preferred embodiment of the planar lighting device according to the second mode of the present invention, the back surface of the unit light guide plate is composed of a pair of inclined faces that are symmetrical with respect to the central parallel groove and the pair of inclined faces are inclined such that the thickness of the unit light guide plate gradually decreases with the increasing distance from the parallel groove toward an end of the unit light guide plate. In another preferred embodiment, the pair of inclined faces is formed of a curved plane.

The light guide plate according to the first aspect of the present invention can suppress the warpage that may be caused by the heat generated from the linear light sources fitted in the grooves in the back surface. Hence, planar illuminating light that is uniform and substantially free from unevenness in brightness can be emitted from the light exit surface.

The planar lighting device according to the second aspect of the present invention prevents or suppresses the occurrence of warpage in the light guide plate due to the heat generated from the linear light sources fitted in the grooves formed in the light guide plate and, as a result, it can emit uniform illuminating light with reduced unevenness in brightness.

DESCRIPTION OF THE PREFERRED EMBODIMENTS

Hereinafter, the light guide plate according to the present invention and the planar lighting device using the same will be described in detail based on the preferred embodiments shown in the accompanying drawings.

Figure 1:
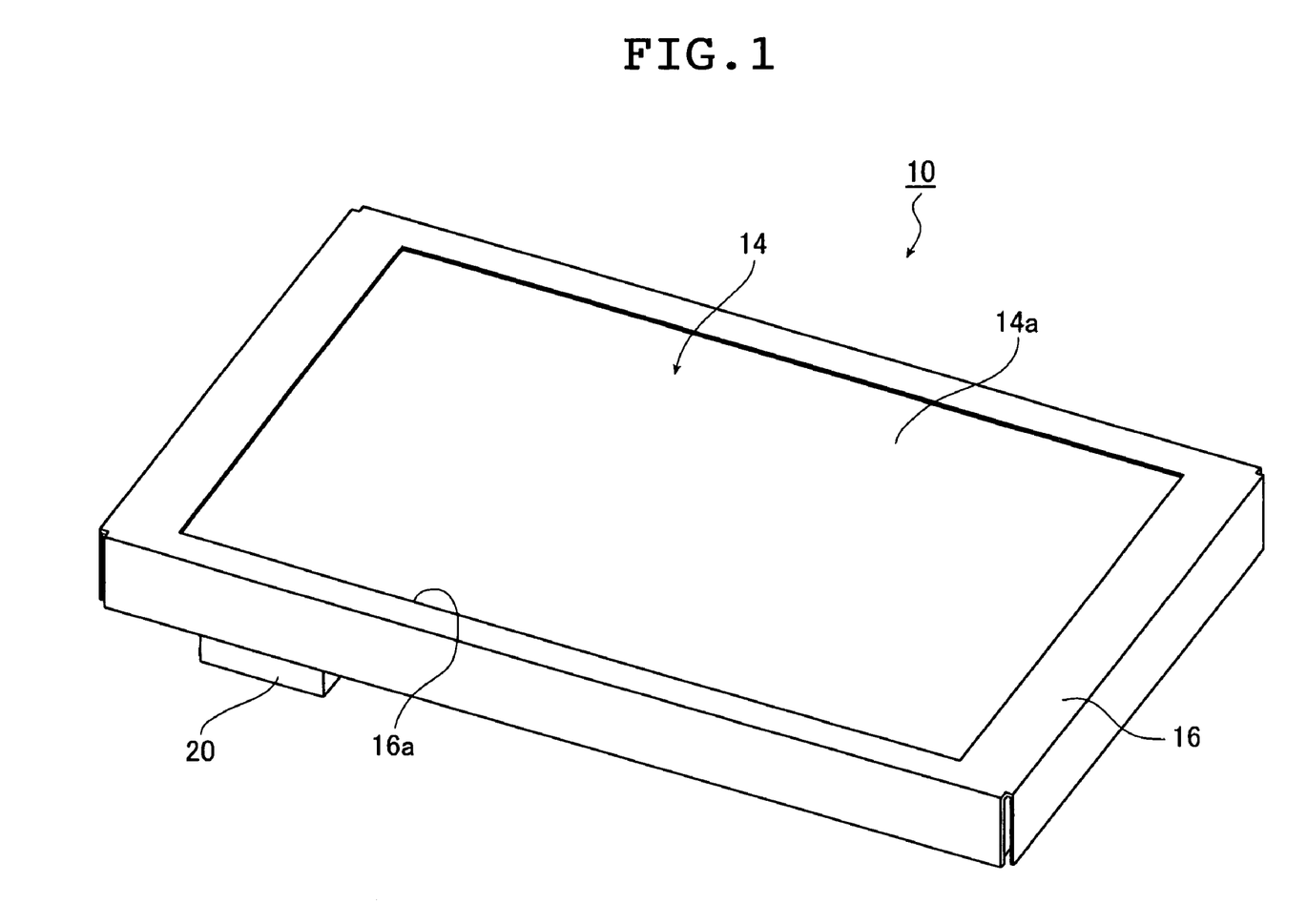
FIG. 1 is a schematic perspective view of an embodiment of the planar lighting device of the present invention as it is seen from the light exit surface.
Figure 2A:
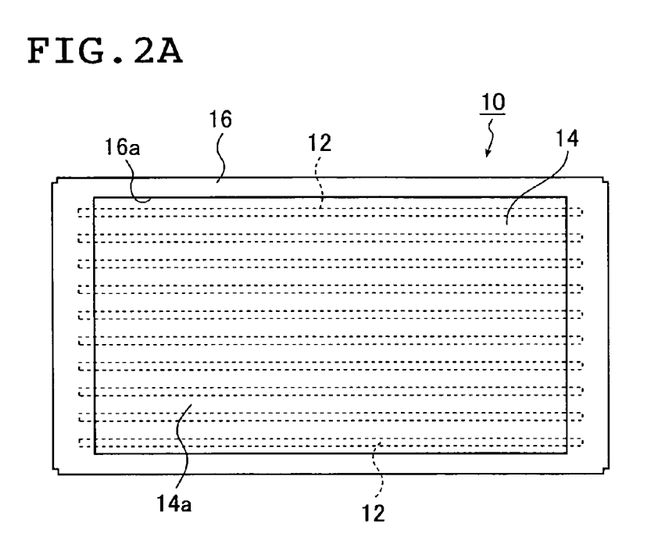
FIGS. 2A, 2B, 2C and 2D are a front view, a longitudinal side view, a transverse side view, and a rear view, respectively, of the planar lighting device shown in FIG. 1.
Figure 2B:
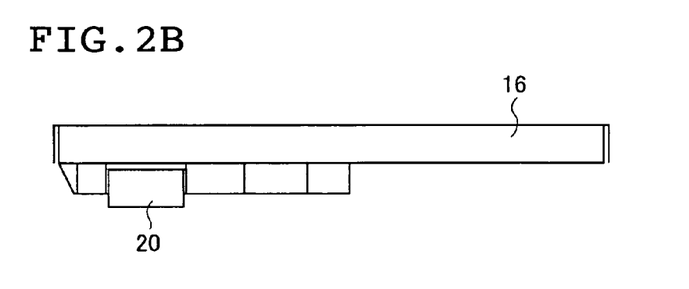
Figure 2C:
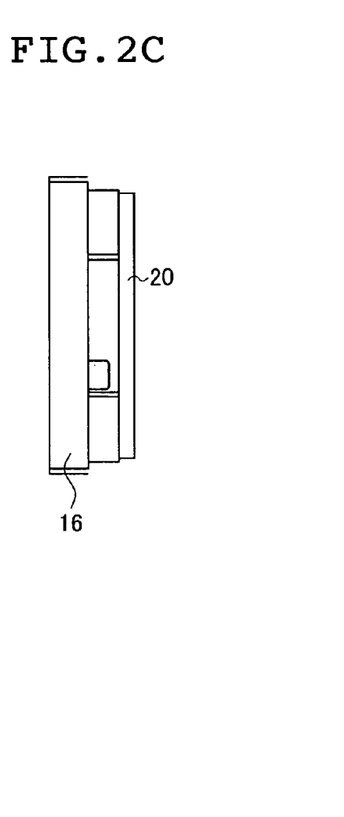
Figure 2D:
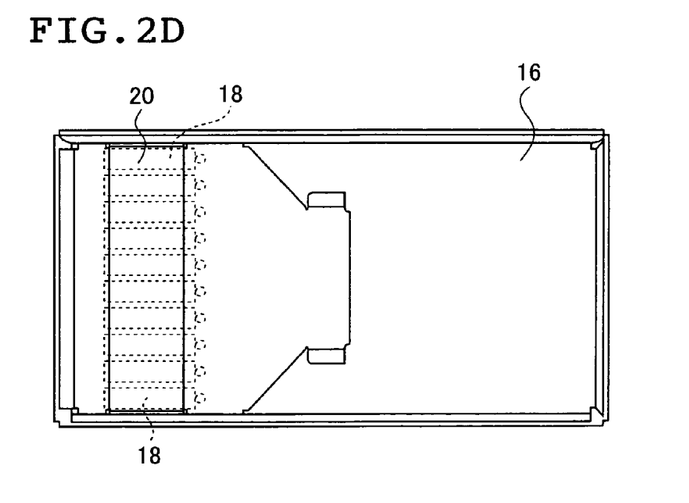
Figure 3:
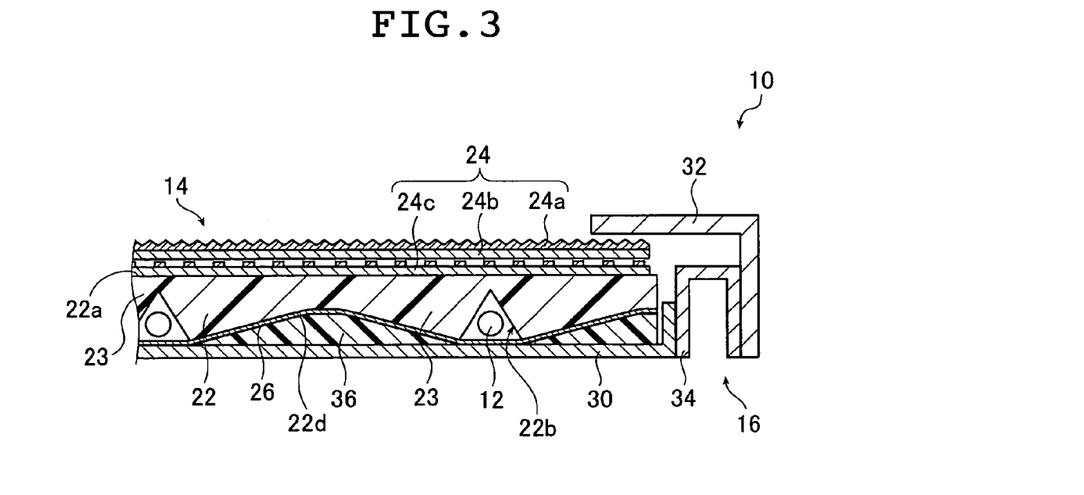
FIG. 3 is a partial section of an embodiment of the planar lighting device shown in FIG. 1.

FIG. 1 is a schematic perspective view of an embodiment of the planar lighting device of the present invention as it is seen from the light exit surface. FIGS. 2A, 2B, 2C and 2D are a front view, a longitudinal side view, a transverse side view, and a rear view, respectively, of the planar lighting device shown in FIG. 1. FIG. 3 is a partial section of an embodiment of the planar lighting device shown in FIG. 1. Note that these and other figures that follow are shown enlarged in the direction of thickness of the planar lighting device in order to provide better understanding.

As shown in FIGS. 1 and 2A-2D, the planar lighting device generally indicated by 10 comprises a main body 14 that includes a plurality of linear light sources 12 and which emits uniform light from a rectangular light exit surface 14a, a housing 16 that accommodates the main body 14 of planar lighting device in its interior and which has a rectangular opening 16a formed on the obverse side which is closer to the light exit surface 14a, an inverter accommodating portion 20 that is provided on the reverse side of the housing 16 that is away from the light exit surface 14a and which accommodates a plurality of inverter units 18 used to turn on the respective linear light sources 12, and a power supply 38 (see FIG. 13) that is connected to the plurality of inverter units 18 in the inverter accommodating portion 20 for turning on the linear light sources 12.

Figure 4:
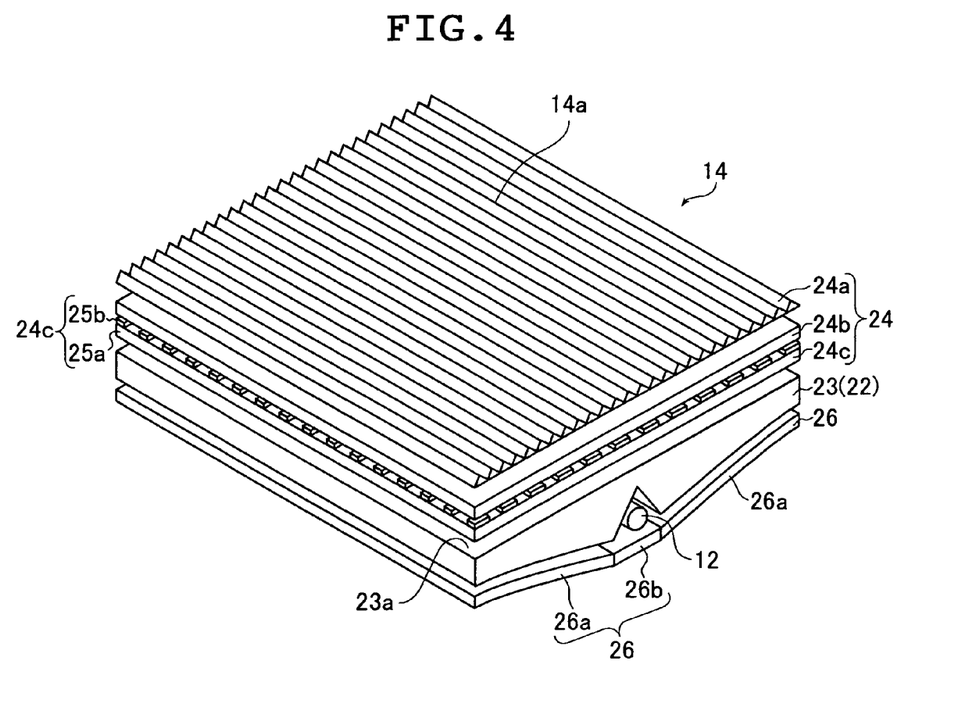
FIG. 4 is a schematic perspective view showing the main body of planar lighting device which corresponds to one unit light guide plate used in the planar lighting device shown in FIG. 3.
Figure 5A:
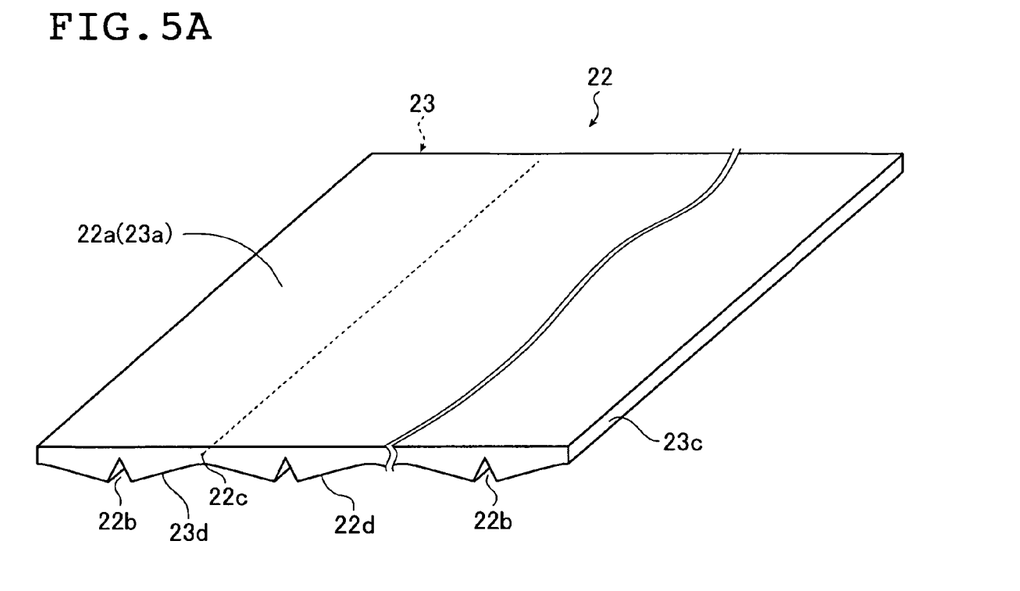
FIG. 5A is a schematic perspective view of the light guide plate used in the planar lighting device shown in FIG. 3.

The main body 14 of lighting device serves to emit uniform light from the rectangular light exit surface 14a and as shown in FIGS. 3, 4 and 5A, it basically comprises a plurality of linear light sources 12, a light guide plate 22, an optical member unit 24, and a reflective member 26. The light guide plate 22 has a rectangular light emerging surface 22a formed on a side closer to the light exit surface 14a and it also has a plurality of parallel grooves 22b formed on the rear side to accommodate the respective linear light sources 12, with the thinnest portion 22c formed in between adjacent parallel grooves 22b that extends from the light emerging surface 22a toward the rear side. The optical unit 24 is provided on the side of the light guide plate 22 that is closer to the light emerging surface 22a and it has a rectangular plane that forms the rectangular light exit surface 14a. The reflective member 26 is provided across the rear surface 22d of the light guide plate 22.

The main body 14 of the lighting device shown in FIG. 4 is such that only the unit light guide plate 23 having one parallel groove 22b that serves as one of the units for composing the light guide plate 22 is shown. In practice, however, the main body 14 of lighting device uses the light guide plate 22 composed of more than one unit light guide plate 23 as shown in FIG. 3 and it goes without saying that the optical member unit 24 provided on top of the light guide plate 22 also has generally the same size (area) as the light emerging surface 22a of the light guide plate 22.

The linear light sources 12 are fitted inside the plurality of parallel grooves 22b in the light guide plate 22 and are respectively connected to the inverter units 18. Each of the linear light sources 12 used in the present invention is a linear, or small-diameter rod of cold-cathode tube (CCFL: see FIG. 13A), which is used for providing planar illumination. In the case under consideration, a cold-cathode tube is used as the linear light source 12 but this is not the sole case of the present invention and the linear light source 12 may be of any type as long as it is a rod of light source (linear light source). Aside from the cold-cathode tube (CCFL), various other light sources can be employed, including, for example, an ordinary fluorescent tube (hot-cathode tube, or HCLF), an external electrode tube (EEFL), a light emitting diode (LED), and a semiconductor laser. If an LED is to be used as the linear light source 12, a light guide member in either a cylindrical or a prismatic form comparable in length to the parallel grooves 22b in the light guide plate 22 may be provided with an LED on both of its top and bottom sides to construct an LED light source, in which the light from the LED is admitted into the top and bottom sides of the light guide member and then allowed to emerge from its lateral sides.

Details about the inverter units 18 and the power supply 38 (see FIG. 13B) that serve to turn on and off the plurality of linear light sources 12 will be given later.

We now describe the light guide plate 22 according to the present invention.

The light guide plate 22 is composed of a plurality of unit light guide plates 23 as shown in FIG. 5A.

Figure 5B:
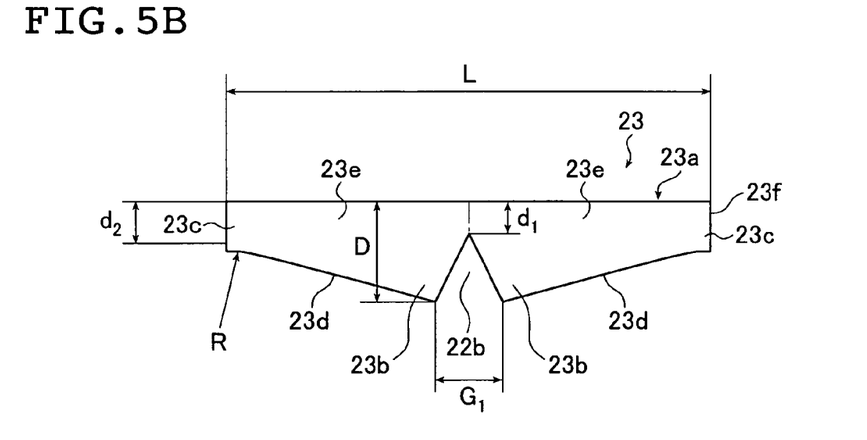
FIG. 5B is a diagram showing the cross-sectional shape of one unit light guide plate in the main body of planar lighting device shown in FIG. 4.

The unit light guide plate 23 is formed of a transparent resin and as shown in FIG. 5B, it comprises an individual rectangular light exit surface 23a, a thick portion 23b parallel to one side of the light exit surface 23a, a thin end portion 23c formed at either side of the thick portion 23b and parallel to one side of the latter, inclined back portions 23e that decrease in thickness with the increasing distance from the thick portion 23b toward the thin end portions 23c in a direction perpendicular to one side of the thick portion 23b, thereby forming flat inclined surfaces 23d that define the rear surface 22d of the light guide plate 22 and which are formed in such a way that only a part near each end portion is curved, and a parallel groove 22b that is formed in the thick portion 23b parallel to one side thereof for accommodating the light source 12. In short, the unit light guide plate 23 has one parallel groove 22b and it also has the individual light exit surface 23a that extends in a direction parallel to the parallel groove 22a and which has the same length as the light exit surface 14a of the light guide plate 22.

The light guide plate 22 according to the present invention is so designed as to satisfy the following inequality (1):

$$(L_0/280)^2 \cdot k(14T^2+710T) \cdot (-0.65 \log S+1.9) \leq 10 \quad (1)$$

where $L_0$ is the length (mm) of the light guide plate in a direction perpendicular to the parallel groove 22b, k is the linear expansion coefficient [/° C.] of the resin material of which the light guide plate 22 is formed, Ts is the surface temperature [° C.] of the linear light source 12 that has become stable after being lit, S is half of the cross-sectional area [mm$^2$] of the unit light guide plate as it is cut through a plane perpendicular to the parallel groove, and T=Ts−25. Details about the inequality (1) will be given later.

As long as the inequality (1) is satisfied, the structures and materials of the light guide plate 22 and the unit light guide plate 23 can be obtained by applying the disclosures under paragraphs [0036] to [0039] in the specification of JP 2005-234397 A which was filed by the assignee of the present invention.

In addition to the illustrated triangular shape, the parallel groove 22b may have any other cross-sectional shapes that are effective in producing uniform brightness, as exemplified by two crossing hyperbolas, a U shape, and a parabola. For examples that can be applied, see under paragraphs [0040]-[0058] in the specification of JP 2005-234397 A which was filed by the assignee of the present invention.

In the illustrated case, the inclined surfaces 23d are formed of a flat plane, provided that only a limited area near each end portion is curved. Alternatively, their entire surfaces may be formed of a curved plane. If desired, they may be formed of a flat plane the entire surface of which is inclined at a constant angle with respect to the individual light exit surface 23a, or each of them may be composed of a plurality of flat planes that gradually vary in inclination. Note, however, that the curved or flat planes which the inclined surfaces 23d may have must be parallel to the parallel groove 22b.

Note also that the parallel groove 22b and the inclined surfaces 23d are not limited in any particular way as regards the profile of their cross section which is taken in a direction perpendicular to the parallel groove 22b. However, if the illuminating light issued from the individual light exit surface 23a has sufficiently high uniformity in brightness and if it is likely to experience only a small drop in brightness, the profiles disclosed in the specification of Japanese Patent Application 2004-325251, also filed by the assignee of the present invention, may be applied.

The unit light guide plate 23 admits the illuminating light issued from the linear light source 12 fitted in the parallel groove 22b; the admitted light travels from the thick portion 23b toward either thin end portion 23c by propagating through the inclined back portion 23e in a direction parallel to the individual light exit surface 23a, and it is also directed toward the inclined surface 23d forming the rear surface of the unit light guide plate 23, whereupon it is reflected by the inclined surface 23d and the reflective member 26 provided across it; in consequence, the incident light is issued from the individual light exit surface 23a as uniform illuminating light.

In this way, uniform illuminating light emerges from the light emerging surface 22a of the light guide plate 22 made of a plurality of unit light guide plates 23 joined together.

As is clear from FIG. 5A, the light guide plate 22 has such a structure that adjacent unit light guide plates 23 that are placed side by side in a direction perpendicular to the parallel grooves 22b are joined at their thin end portions 23c, with the joint between the thin end portions 23c forming the thinnest portion of the light guide plate 22. Needless to say, the light exit surfaces 23a of the individual unit light guide plates 23 are joined flush to each other so that the light emerging surface 22a formed in the completed light guide plate 22 presents a uniform flat plane.

The light guide plate 22 shown in FIG. 5A is such that a plurality of unit light guide plates 23 as joined together have been subjected to monolithic molding to make a single block of light guide plate. If desired, with a view to achieving cost reduction, higher yield and easier manufacturing, a plurality of such blocks of light guide plate that are formed by subjecting a plurality of joined unit light guide plates 23 to monolithic molding may in turn be joined together to fabricate a larger light guide plate having a light emerging surface 22a of large enough area. In this alternative case, three approaches may be taken; in one example, adjacent blocks of light guide plate are joined together at the mating thin end portions 23c of unit light guide plates 23 so that they connect in a direction perpendicular to the parallel grooves 22b, thereby achieving size enlargement to increase the area of the light emerging surface 22a; in another example, adjacent blocks of light guide plate are joined together at the mating end portions that are perpendicular to the thin end portions 23c of unit light guide plates 23 so that they connect in a direction parallel to the parallel grooves 22b, thereby achieving size enlargement to increase the area of the light emerging surface 22a; in the last example, those two approaches are taken concurrently and adjacent blocks of light guide plate are connected in two directions, one being parallel and the other perpendicular to the parallel grooves 22b, thereby achieving further size enlargement to increase the area of the light emerging surface 22a. Needless to say, the uniform planar light exit surfaces 23a of the individual blocks of light guide plate are joined flush to each other so that the light emerging surface 22a formed in the completed light guide plate 22 presents a uniform flat plane. In this case, the linear light sources 12 are each preferably equal in length to the parallel grooves 22b in the light guide plate 22 completed by joining a plurality of blocks of light guide plate; it is also preferred that the optical member unit 24 to be provided on top of the light guide plate 22 has generally the same size (area) as the light emerging surface 22a of the light guide plate 22.

As already mentioned, the light guide plate 22 according to the present invention is so designed as to satisfy the following inequality (1):

$$(L_0/280)^2 \cdot k(14T^2+710T) \cdot (-0.65 \log S+1.9) \leq 10 \quad (1)$$

where $L_0$ is the length (mm) of the light guide plate in a direction perpendicular to the parallel groove 22b, $k$ is the linear expansion coefficient [/° C.] of the resin material of which the light guide plate 22 is formed, Ts is the surface temperature [° C.] of the linear light source 12 that has become stable after being lit, S is half of the cross-sectional area [mm$^2$] of the unit light guide plate as it is cut through a plane perpendicular to the parallel groove, and T=Ts−25. Because of this design, even if the temperature of the bottom surface of the light guide plate rises after the linear light sources are kept on for a prolonged period, the light guide plate is substantially free from warpage, and illumination that is uniform and free from unevenness in brightness can be issued from the light emerging surface. A detailed rationale of the inequality (1) is described below.

The present inventors used thermal structure analyzing software to calculate the amounts of warpage of the light guide plate as the stabilizing temperature of the linear light sources and the thermal expansion coefficient of the light guide plate were varied. The light guide plate used as a model for warpage analysis was of such a structure that comprises 10 unit light guide plates of the shape shown in FIG. 5B formed into a monolithic plate. Each light source had a diameter of 2.6 mm. The unit light guide plate had the following dimensions (see FIG. 5B): the pitch or width L of the unit light guide plate 22 was 28 mm; the thickness D of the thickest part of the thick portion 22b of the unit light guide plate 22 was 5.5 mm; the distance $d_1$ between the bottom portion of the parallel groove 22b and the light exit surface 23a was 1.0 mm; the thickness $d_2$ of the unit light guide plate at the face which would be thinnest if the inclined back surface 23d were assumed to have a flat end was 2.87 mm; the width $G_1$ of the mouth of the parallel groove 22b which was away from the light exit surface 23a was 5.2 mm; the radius of curvature R of an extremely thin portion near the joint face 23f that extended from the inclined back surface which was assumed to have a planar shape at the end connecting to an adjacent unit light guide plate was 15 mm. The light exit surface 23a formed an angle of 15.76 degrees with the inclined back surface 23d.

Four samples of light guide plate were used and they had linear expansion coefficients of $3.00 \times 10^{-5}$ [/° C.], $6.00 \times 10^{-5}$ [/° C.], $7.00 \times 10^{-5}$ [/° C.], and $1.00 \times 10^{-4}$ [/° C.]. The linear light source was adjusted to have a stabilizing temperature of 60° C. or 90° C. The stabilizing temperature means the temperature at which the surface temperature of the light source becomes constant.

Figure 6:
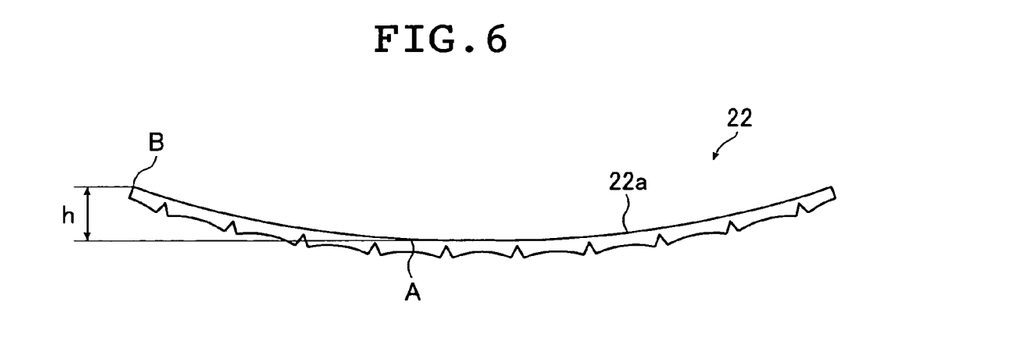
FIG. 6 is an illustration that defines the amount of warpage in the light guide plate.

FIG. 6 illustrates how the amount of warpage h in the light guide plate 22 is determined; as shown, it is represented by the distance h between the lowest position A and the highest position B of the light emerging surface 22a as measured in the vertical direction of the figure when both ends of the light emerging surface 22a are disposed on the same level in the vertical direction. To measure the amount of warpage h in the light guide plate 22, the linear light source 12 was lit and kept on until it attained the stabilizing temperature.

Figure 7:
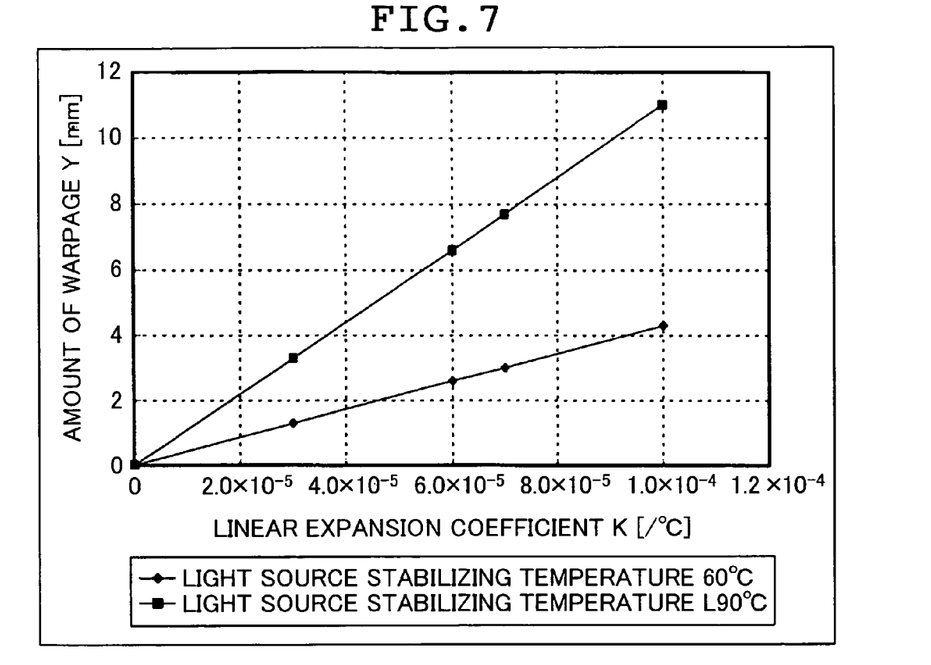
FIG. 7 is a graph showing the amounts by which four different light guide plates having different linear expansion coefficients warped when a linear light source stabilized at temperatures of 60° C. and 90° C.
Figure 8:
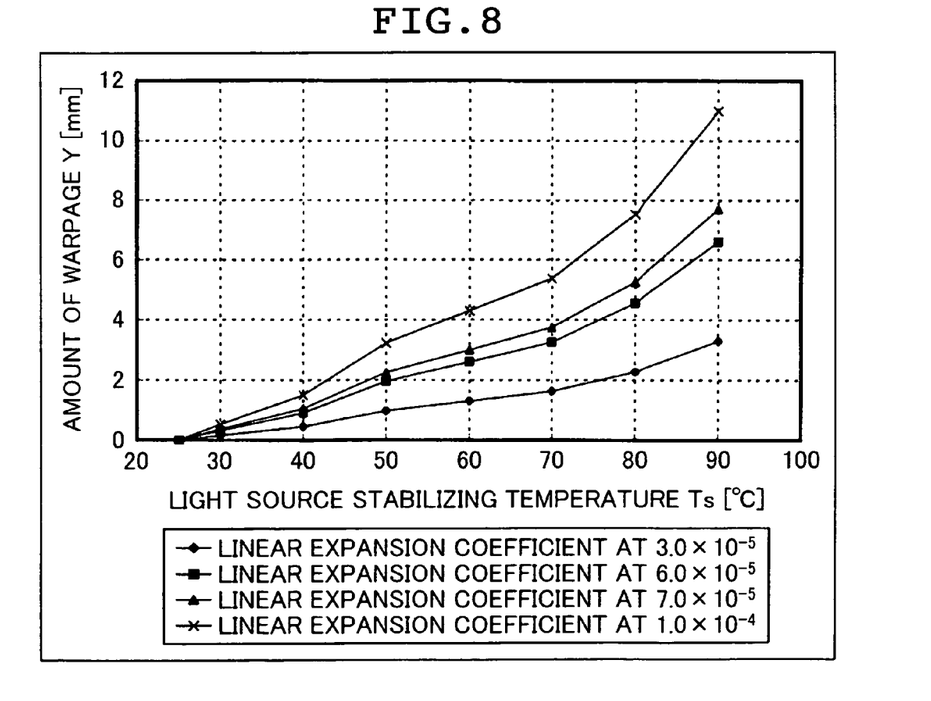
FIG. 8 is a graph showing how the amount of warpage occurring to four different light guide plates having different linear expansion coefficients changed with the light source stabilizing temperature.

FIG. 7 is a graph showing how much warpage the four samples of light guide plate having different linear expansion coefficients experienced when the linear light source 12 was lit and kept on until it stabilized at 60° C. or 90° C. FIG. 8 is a graph showing how the amount of warpage occurring in the four samples of light guide plate having different linear expansion coefficients varied with the stabilizing temperature. As one can see from FIG. 7, the amount of warpage that occurs in the light guide plate is proportional to the linear expansion coefficient of the constituent material of the light guide plate. It is also clear from FIG. 8 that the light guide plate undergoes more warpage as the stabilizing temperature of the light source becomes progressively higher than a room temperature of 25° C.

Figure 9:
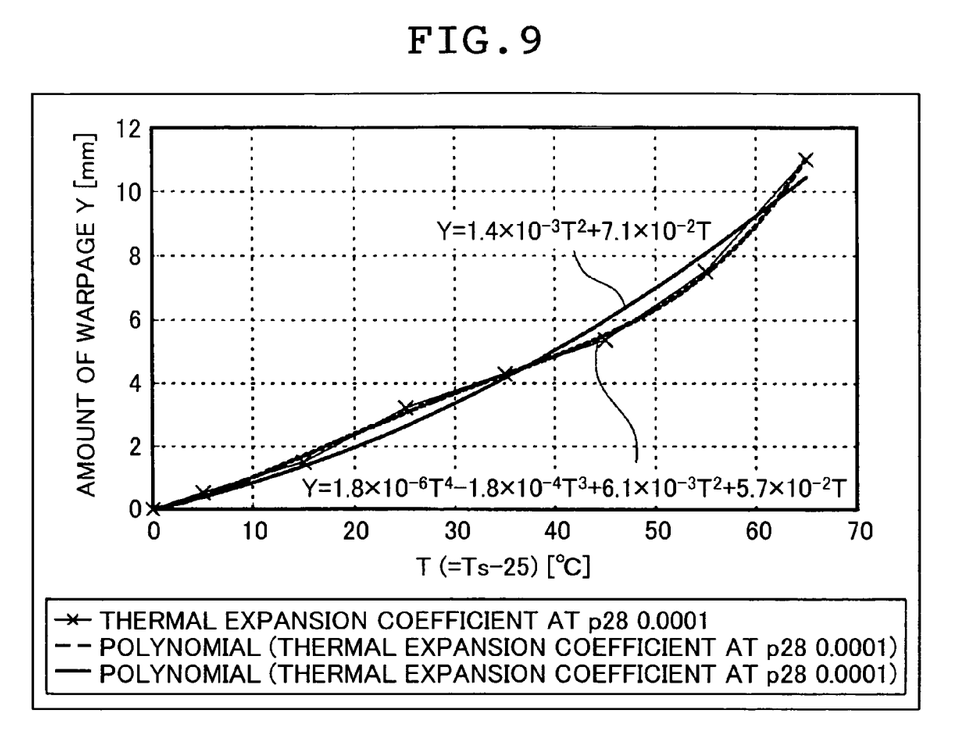
FIG. 9 is a graph showing the curves in FIG. 8 for the amount of warpage in the light guide plate with a linear expansion coefficient of 1.00×10$^{-4}$ as a function of the light source stabilizing temperature, except that it was subjected to coordinate transformation for readjusting the origin to room temperature (25° C.)

The curve in FIG. 8 that shows the amount of warpage in the light guide plate with a linear expansion coefficient of $1.00 \times 10^{-4}$ as a function of the stabilizing temperature Ts may be redrawn as shown in FIG. 9 by performing coordinate transformation such that the origin is at the room temperature 25° C. Two approximation curves are shown in FIG. 9, one being represented by the following biquadratic polynomial (2) and the other by the following quadratic polynomial (3):

$$Y=1.8 \times 10^{-6}T^4-1.8 \times 10^{-4}T^3+6.1 \times 10^{-3}T^2+5.7 \times 10^{-2}T \qquad (2)$$

$$Y=1.4 \times 10^{-3}T^2+7.1 \times 10^{-2}T \qquad (3)$$

From these results, the amount of warpage Y in the light guide plate is expressed by the following equation (4):

$$Y=k(14T^2+710T) \qquad (4)$$

where k is the linear expansion coefficient and T is the temperature (=stabilizing temperature Ts−25).

Figure 10:
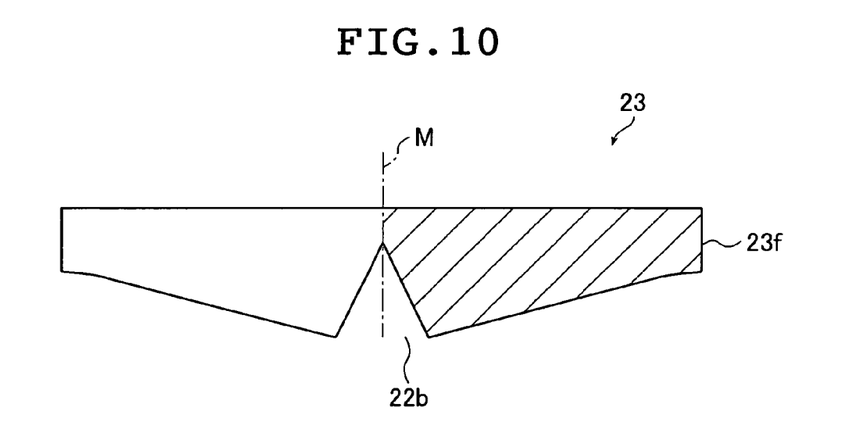
FIG. 10 is an illustration that describes the cross-sectional area of the unit light guide plate over one half of its pitch.
Figure 11:
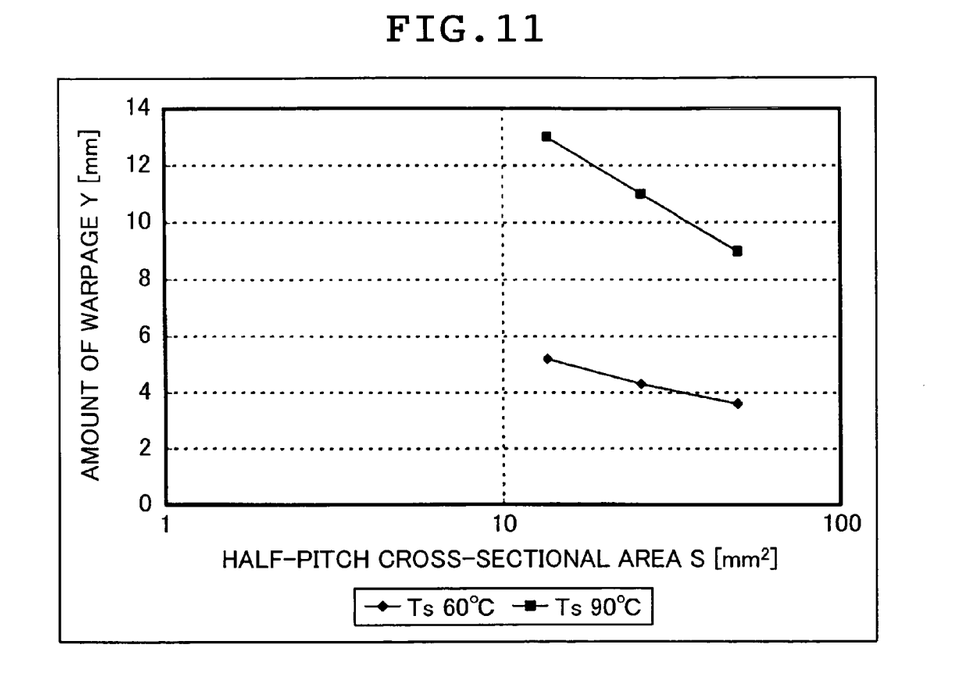
FIG. 11 is a graph showing the amount of warpage as a function of the cross-sectional area S of the unit light guide plate over one half of its pitch.

In the next step, the present inventors investigated the relation between the amount of warpage Y and the cross-sectional area S of the unit light guide plate over one half of its pitch. Here the cross-sectional area S is one half the area of a cross section of the unit light guide plate that is cut by a plane perpendicular to the parallel groove and, as illustrated in FIG. 10, it represents the area of a section of the unit light guide plate 23 as cut over one half of its pitch, namely, the range from the center line M to an end face 23f (which is hatched in FIG. 10). Two light guide plate models having an overall length of 280 [mm] were constructed and analyzed by the same thermal structural analyzing software as described above: one model consisted of 20 unit light guide plates each having a pitch of 14 [mm] joined together, and the other model consisted of 5 unit light guide plates each having a pitch of 56 [mm] joined together. In the analysis, calculation was made on the assumption that the unit light guide plate had a parallel groove of basically the same shape as the light guide plate 23 shown in FIG. 5B, the only difference being in the pitch of the unit light guide plate, namely, the number of the unit light guide plates joined together. Using these models, analysis was made as described above to determine the amounts of warpage that occurred when the light guide plates had a linear expansion coefficient k of $1 \times 10^{-4}$ [/° C.] and the stabilizing temperature was 60° C. or 90° C. FIG. 11 is a graph showing the amount of warpage as a function of the cross-sectional area S of the unit light guide plate over one half of its pitch.

Figure 12:
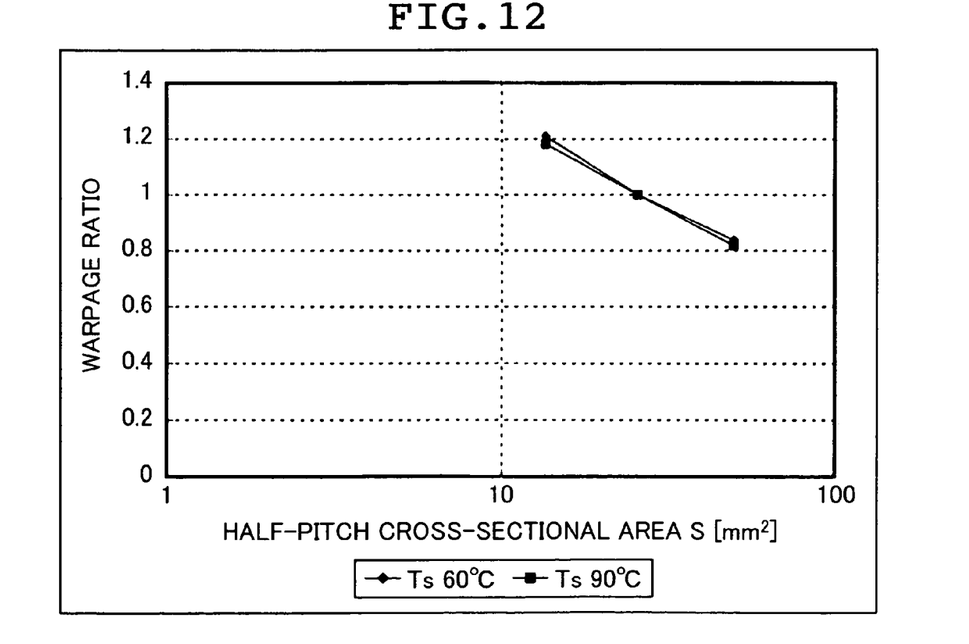
FIG. 12 is a graph showing the relative warpage as a function of the cross-sectional area S of the unit light guide plate over one half of its pitch.

In a further analysis, the two models of light guide plate, one consisting of 20 units having a pitch of 14 [mm] joined together and the other consisting of 5 units having a pitch of 56 [mm] joined together, were determined for their ratio of warpage to that occurring in a model consisting of 10 units having a pitch of 28 [mm] joined together. FIG. 12 is a graph showing the ratio of warpage as a function of the cross-sectional area S of the unit light guide plate over one half of its pitch.

As one can see from FIG. 12, when the cross-sectional area S is halved, the amount of warpage in the light guide plate increases by a factor of 1.2 and when the cross-sectional area is doubled, the amount of warpage in the light guide plate increases by a factor which is the reciprocal of 1.2. In other words, the relation between the amount of warpage Y in the light guide plate and the logarithm of the cross-sectional area S is expressed as a linear function.

From these results, the amount of warpage Y in the light guide plate is expressed by the following equation (5). In the equation (5), a factor $(L_0/280)^2$ is multiplied as normalizing factor of the model length since the model of the light guide plate for analysis has the length $L_0$ of 280 mm in a direction perpendicular to the parallel groove 22b.

$$Y=(L_0/280)^2 \cdot k(14T^2+710T) \times (-0.65 \log S+1.9) \qquad (5)$$

where $L_0$ is the length (mm) of the light guide plate in a direction perpendicular to the parallel groove 22b, k is the linear expansion coefficient, T is the temperature (=stabilizing temperature Ts−25), and S is the cross-sectional area of the unit light guide plate over one half of its pitch.

Hence, by combining the linear expansion coefficient k, the temperature T (=stabilizing temperature Ts−25), and the cross-sectional area S of the unit light guide plate over one half of its pitch in such a way that Y is 10 mm or smaller, one can obtain a light guide plate that is substantially free from the warpage that might otherwise occur on account of the heat from the linear light source fitted in the parallel groove.

This can be realized as follows: given a linear light source that is to be used in the planar lighting device, one may first measure the stabilizing temperature of that linear light source and then set the range in which the linear expansion coefficient k and the cross-sectional area S of the unit light guide plate over one half of its pitch satisfy the inequality (1); by subsequently fabricating a light guide plate such that the inequality defining such range is satisfied, one can obtain a light guide plate that is substantially free of warpage that might be caused by the heat from the linear light source. If, in addition to the linear light source that is to be used, the materials that are available for the light guide plate are limited, one may design the shape of the light guide plate in such a way that the cross-sectional area S satisfies the inequality (1).

The following table lists the resin materials that are preferably used in the light guide plate, as well as their linear expansion coefficients.

TABLE 1

| Name | Linear expansion coefficient [/° C.] |
| --- | --- |
| Polyethylene terephthalate (PET) | $6 \times 10^{-5}$ |
| Polymethyl methacrylate (PMMA) | $7 \times 10^{-5}$ |
| Polycarbonate (PC) | $7 \times 10^{-5}$ |
| Polyvinyl chloride (PVC) | $7 \times 10^{-5}$ |
| Cycloolefin polymer (COP) | $7 \times 10^{-5}$ |
| Polyethylene (PE) | $11 \times 10^{-5}$ |
| Polypropylene (PP) | $11 \times 10^{-5}$ |

Among the materials listed in the table, PMMA is more preferably used in view of the cost and transparency, as well as the ease with which it can satisfy the inequality (1).

On the foregoing pages, the light guide plate 22 that conforms to the present invention has been described in detail.

We now describe the optical member unit. The optical member unit 24 increases the uniformity of the illuminating light from the light emerging face 22a of the light guide plate 22 so that even more uniform illuminating light issues from the light exit surface 14a of the main body of lighting device 14. As shown in FIGS. 3 and 4, the optical member unit 24 comprises a prism sheet 24a, a diffusion sheet 24b, and a transmittance adjusting member 24c. The prism sheet 24a has a row of micro-prisms formed parallel to the parallel grooves 22b in the light guide plate 22b so that they compose the light exit surface 14a and it serves to provide higher brightness by ensuring that the illuminating light issued from the light emerging surface 22a of the light guide plate 22 condenses more efficiently. The diffusion sheet 24b diffuses the illuminating light from the light emerging surface 22a of the light guide plate 22 so that it becomes uniform. The transmittance adjusting member 24c is used to reduce the unevenness in brightness of the illuminating light issued from the light emerging surface 22a of the light guide plate 22 and it comprises a transparent film 25a and a number of transmittance adjusters 25b that are provided on the surface of the transparent film 25a depending upon the unevenness in brightness and which themselves are diffusing reflectors.

The transmittance adjusting member 24c is preferably provided on the side of the light guide plate 22 that is closer to the light emerging surface 22a; however, the order in which the prism sheet 24a and the diffusion sheet 24b are to be provided and the number of such prism sheets and diffusion sheets are not limited in any particular way. In addition, the prism sheet 24a, the diffusion sheet 24b and the transmittance adjusting member 24c that are to be used in the optical member unit 24 are by no means limited to the structures described above and any kind of optical member may be employed as long as it can increase the uniformity of the illuminating light issued from the light emerging surface 22a of the light guide plate 22. Note also that the prism sheet 24a may be provided between the light guide plate 22 and the reflective member 26 on its rear surface 22d; alternatively, a row of prisms may directly be formed on the rear surface 22d of the light guide plate 22.

As for the optical members that can be used in the optical member unit 24 comprising the prism sheet 24a, the diffusion sheet 24b and the transmittance adjusting member 24c, reference may be had to the paragraphs [0028] to [0033] in the specification of JP 2005-234397 A filed by the assignee of the present invention.

The reflective member 26 used in the main body of lighting device 14 is provided across the rear surface 22d of the light guide plate 22 and it serves to improve the efficiency of utilization of the illuminating light issued from the linear light sources 12. It comprises a reflective sheet 26a and a reflector 26b. The reflective sheet 26a is provided on the rear side of the light guide plate 22 where the parallel grooves 22b are formed and it covers the whole rear surface 22d of the light guide plate 22 except where the parallel grooves 22b are formed; the light leaking from the backside of the light guide plate 22 is reflected by the reflective sheet 26a so that it is allowed to be incident again on the light guide plate 22. The reflector 26b is provided between adjacent reflective sheets 26a at the back of the linear light source 12 in such a way as to close each of the parallel grooves 22b in the light guide plate 22; it reflects light coming from the lower surface of the linear light source 12 so that the reflected light is incident on the inner surfaces of the lateral sides of the parallel groove 22b in the light guide plate 22.

This is the basic construction of the main body of lighting device 14.

We next describe the housing 16 for accommodating the main body of lighting device 14. The housing 16 serves to support the main body of lighting device 14 as the latter is accommodated in the housing 16 and the housing 16 also fixes the main body 14 by holding it on two sides, one facing the light exit surface 14a and the other facing the reflective member 26. As shown in FIG. 3, the housing 16 comprises a lower housing 30, an upper housing 32, a turnup member 34, and a light guide plate support member 36. The lower housing 30 is open on the top and supports the main body of lighting device 14 as the latter is accommodated in it, with the four lateral sides of the main body 14 being covered by the lower housing 30. The upper housing 32 forms on the top a rectangular opening 16a smaller than the rectangular light exit surface 14a of the main body of lighting device 14, is open on the bottom, and is slipped from above over the main body of lighting device 14 within the lower housing 30 in such a way that it also covers the four lateral sides of both. The turnup member 34 is of an inverted U shape and is to be inserted between a sidewall of the lower housing 30 and the mating sidewall of the upper housing 32. The light guide plate support member 36 is provided on the bottom of the lower housing 30 and supports the rear surface 22d of the light guide plate 22 via the reflective member 26 and thereby supports the main body of lighting device 14 as a whole. Although not shown in FIG. 3, an inverter accommodating portion 20 (see FIG. 2) that accommodates a plurality of inverter units 18 is fitted on the rear side of the lower housing 30.

In order to join the lower housing 30 to the turnup member 34, and the turnup member 34 to the upper housing 32, various known methods can be employed, such as the combination of bolts and nuts, and the use of an adhesive.

The upper housing 32 must be larger than the lower housing 30 so that the turnup member 34 can at least be provided in the gap between the outer surface of each one of the two lateral sides of the lower housing 30 and the inner surface of each one of the corresponding sides of the upper housing 32. The two lateral sides of the lower housing 30 are parallel to the parallel grooves 22b in the light guide plate 22 in the main body of lighting device 14 or the linear light sources 12 accommodated in those parallel grooves 22b. If desired, the turnup member 34 may be provided on the four sides of the housing 16 between the sidewall of the lower housing 30 and the inner side of the upper housing 32. It is preferable to attach a reinforcement member that reinforces the recess in the U-shaped turnup member 34.

The provision of the turnup member 34 contributes to increasing the rigidity of the housing 16 and the attachment of the reinforcement member contributes to further increasing the strength of the housing 16.

The light guide plate support member 36 is formed of a resin such as polycarbonate. In the illustrated case, the light guide plate support member 36 is a convex member having a profile that is an inverse of the profile of the rear surface 22d of the thinnest portion 22c of the light guide plate 22 and it is provided on the bottom of the lower housing 30 across the rear surface 22d of the light guide plate 22 at given intervals that are determined by the spacing between the thinnest portions 22c of the light guide plate 22. This is not the sole case of the present invention and the light guide plate support member 36 may be a continuous member in which convex portions having a profile that is an inverse of the profile of the rear surface 22d of the light guide plate 22 are provided at given intervals.

Note also that the housing 16 may be provided with optional members including fasteners such as L-shaped fittings for joining its four corners, an elastic member that is formed of an elastic materials such as rubber and which is to be fitted between the prism sheet 24a in the main body of lighting device 14 and the opening 16a in the upper housing 32, and a protective member that protects the whole top surface of the prism sheet 24a in the main body of lighting device 14.

This is the basic composition of the housing 16.

We next describe the drive unit for driving a plurality of linear light sources 12 accommodated inside the parallel grooves 22b in the light guide plate 22 in the main body of lighting device 14.

Figure 13A:
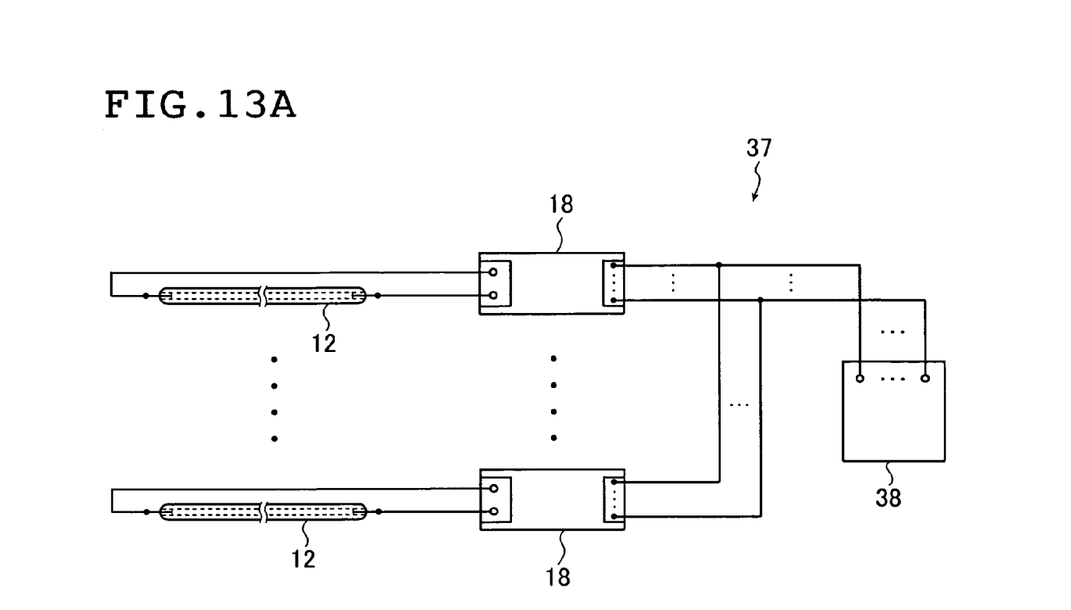
FIG. 13A is a wiring diagram for one embodiment of a drive unit for linear light sources used in the planar lighting device shown in FIG. 2.
Figure 13B:
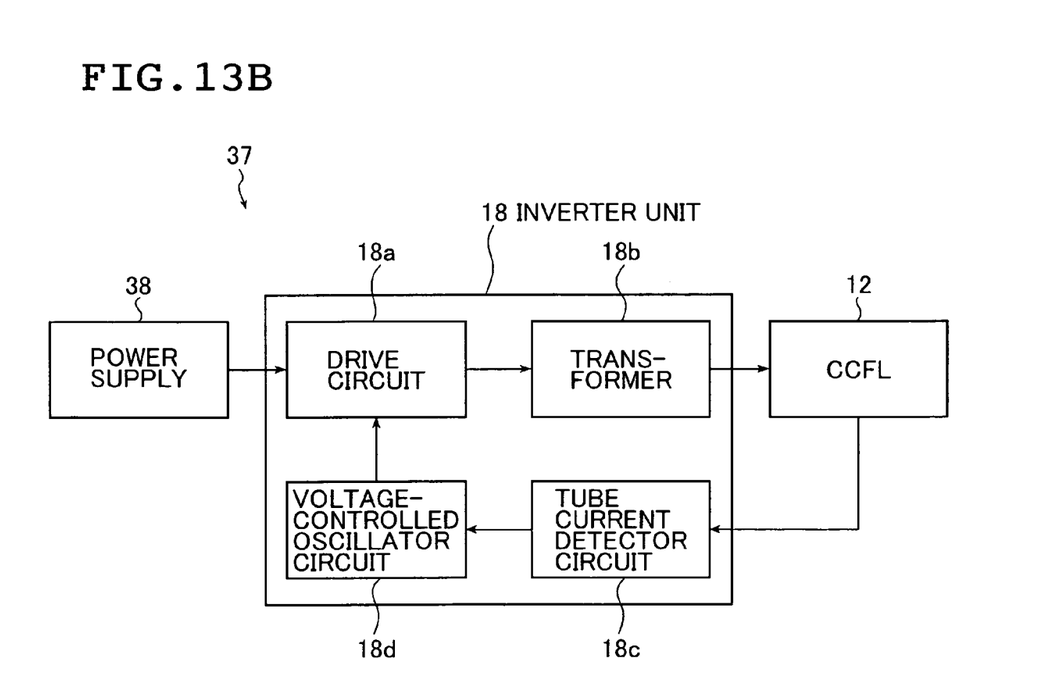
FIG. 13B is a block diagram for the drive unit for one linear light source that is shown in FIG. 13A.

The drive unit generally indicated by 37 in FIGS. 13A and 13B serves to drive, namely, turn on and off, the plurality of linear light sources 12 such as CCFLs, thereby driving the illuminating action of the planar lighting device 10. Having this function, the drive unit 37 comprises a plurality of inverter units 18 that are connected to the respective linear light sources 12 such as CCFLs and a power supply that is connected to the plurality of inverter units 18. FIG. 13B is a block diagram of the drive unit 37 for turning on one linear light source 12 such as a CCFL and this is intended to show details of the composition of the inverter unit 18.

The power supply 38 is a DC power supply for outputting a DC voltage, say, at 24 volts. This DC voltage is supplied to each of the inverter units 18 connected to the power supply 38.

The inverter unit 18 comprises a drive circuit 18a, a transformer 18b, a tube current detector circuit 18c, and a voltage-controlled oscillator circuit 18d. The drive circuit 18a receives the DC voltage from the power supply 38 and generates a primary AC signal of a predetermined frequency at a predetermined voltage (say, 650 Vp-p). The transformer 18b is connected to the linear light source 12 and boosts the primary AC signal generated in the drive circuit 18a to a secondary AC signal having a sufficiently high voltage (say, 6500 Vp-p and 1000-2400 Vrms) to turn on the linear light source 12 such as a CCFL. The tube current detector circuit 18c is also connected to the linear light source 12 such as a CCFL and detects a tube current flowing through it. The voltage-controlled oscillator circuit 18d receives a feedback of the tube current delivered from the tube current detector circuit 18c and in accordance with the tube current thus fed back, it generates a clock (fundamental wave) of a frequency for generating the primary AC signal in the drive circuit 18a.

This is the way the drive unit 37 for the linear light source 12 is constructed in the present invention and, as a result, the plurality of linear light sources 12 can be lit up simultaneously and uniformly with high efficiency in a consistent and safe manner, thereby allowing for light emission at uniform brightness.

In the foregoing description, the plurality of linear light sources 12 are lit up simultaneously; however, it is also within the scope of the present invention that the inverter units 18 are driven to turn on a selected group of linear light sources or that one inverter unit 18 is switched to another group.

Described on the foregoing pages are the basic compositions of the drive unit for the linear light sources, as well as the planar lighting device using such light sources.

The planar lighting device of the present invention can be utilized to illuminate both indoors and outdoors as a backlight for liquid crystal display panels, advertising panels, advertising pillars, and signs in general.

Note, in particular, that since the light guide plate in accordance with the first aspect of the present invention is suppressed in the occurrence of warpage, the planar lighting device in accordance with the second aspect of the present invention which is equipped with this light guide plate may be used as a backlight for a liquid crystal display panel without causing any possibility that some part of the backlight is pressed onto the liquid crystal display panel upon becoming deformed on account of warpage in the light guide plate. Therefore, by using the planar lighting device of the present invention as a backlight for a liquid crystal display panel, one can prevent or suppress uneven displaying that might otherwise occur due to the deformation of the planar lighting device.

Figure 14:
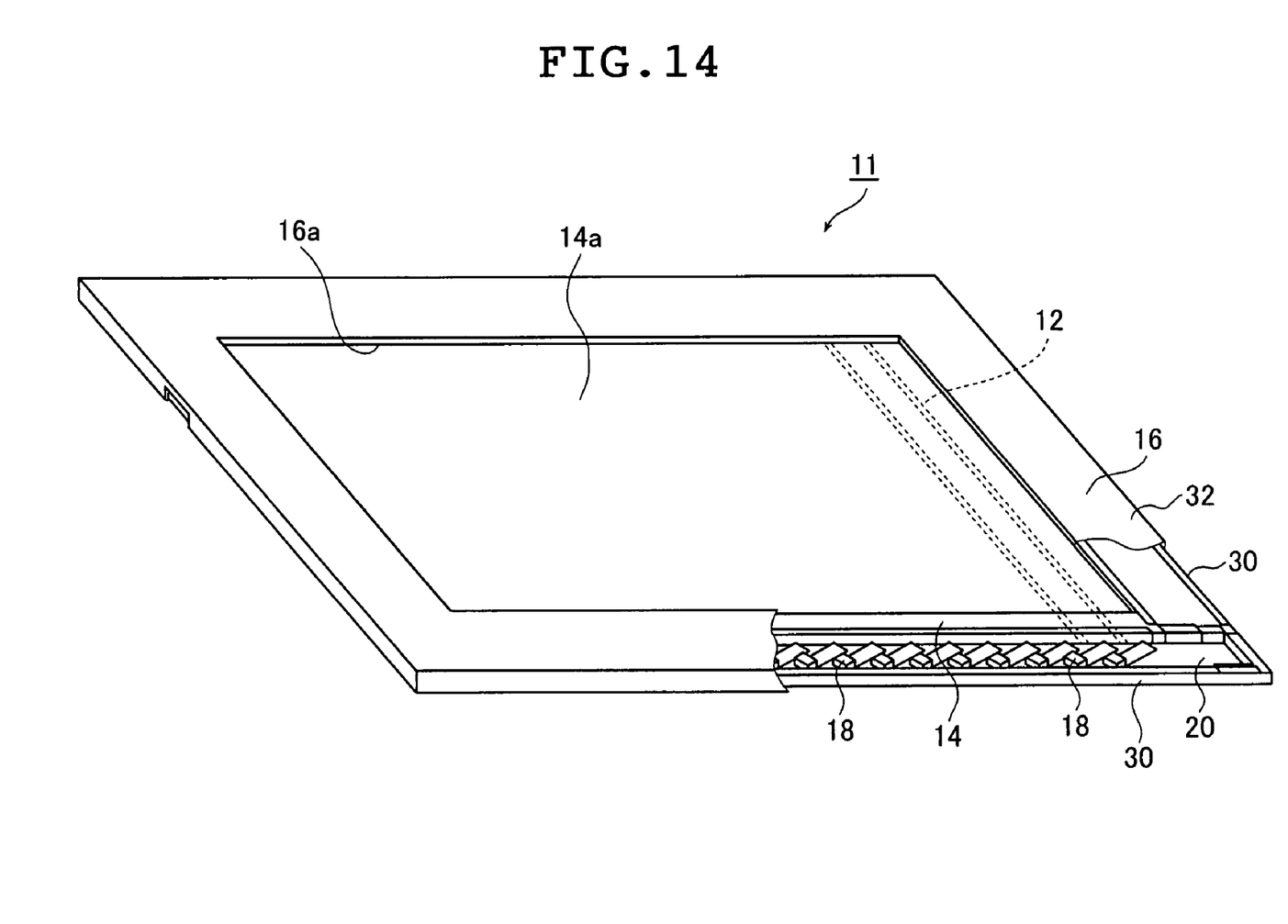
FIG. 14 is a schematic compositional view showing another embodiment of the planar lighting device of the present invention.

In the foregoing embodiment of the planar lighting device which is indicated by 10, the inverter accommodating portion 20 is provided on the rear side of the housing 16 to accommodate a plurality of inverter units 18. However, this is not the sole case of the present invention and the planar lighting device may be modified as generally indicated by 11 in FIG. 14, where a space is provided between the lower housing 30 and the upper housing 32 in an area adjacent a side of the opening 16a in the housing 16 that is perpendicular to the linear light sources 12, so as to create the inverter accommodating portion 20 in which a plurality of inverter units 18 are to be accommodated. In this way, the rear surface of the planar lighting device 11 and, hence, the rear surface of the housing 16 is made sufficiently flat that it can be installed on ceilings or walls more easily.

While the light guide plate and the planar lighting device of the present invention have been described above in detail, the present invention is by no means limited to the foregoing embodiments and various improvements and alterations can of course be made without departing from the gist of the invention.

What is claimed is:

1. A light guide plate comprising a plurality of unit light guide plates that are formed of a transparent resin material and which are joined together, each of the unit light guide plates having a flat rectangular light exit surface, and a back surface that is opposite the light exit surface and which has a parallel groove formed in generally a center and parallel to a side of the rectangular light exit surface, wherein the light guide plate is used with a linear light source fitted in the parallel groove and satisfying the inequality:

$$(L_0/280)^2 \cdot k(14T^2+710T) \cdot (-0.65 \log S+1.9) \leq 10$$

where $L_0$ is the length (mm) of the light guide plate in a direction perpendicular to the parallel groove, k is the linear expansion coefficient [/° C.] of the resin material, Ts is the surface temperature [° C.] of the linear light source that has become stable after being lit, S is half of cross-sectional area

[mm²] of the unit light guide plate as the unit light guide plate is cut through a plane perpendicular to the parallel groove, and T=Ts−25.

2. The light guide plate according to claim 1, wherein the back surface of the unit light guide plate is composed of a pair of inclined faces that are symmetrical with respect to the central parallel groove and the pair of inclined faces are inclined such that thickness of the unit light guide plate gradually decreases with increasing distance from the parallel groove toward an end of the unit light guide plate.

3. The light guide plate according to claim 2, wherein the pair of inclined faces are formed of a curved plane.

4. A planar lighting device comprising
   a light guide plate comprising a plurality of unit light guide plates that are formed of a transparent resin material and which are joined together,
   each of the unit light guide plates having a flat rectangular light exit surface and a back surface that is opposite the light exit surface and which has a parallel groove formed in generally a center and parallel to a side of the rectangular light exit surface, and a linear light source fitted in the parallel groove in the light guide plate,
   wherein the planar lighting device satisfying the inequality:

$$(L_0/280)^2 \cdot k(14T^2+710T) \cdot (-0.65 \log S+1.9) \leq 10$$

where $L_0$ is the length (mm) of the light guide plate in a direction perpendicular to the parallel groove, k is the linear expansion coefficient [/° C.] of the resin material, Ts is the surface temperature [° C.] of the linear light source that has become stable after being lit, S is half of the cross-sectional area [mm²] of the unit light guide plate as the unit light guide plate is cut through a plane perpendicular to the parallel groove, and T=Ts−25.

5. The planar lighting device according to claim 4, wherein the back surface of the unit light guide plate is composed of a pair of inclined faces that are symmetrical with respect to the central parallel groove and the pair of inclined faces are inclined such that thickness of the unit light guide plate gradually decreases with increasing distance from the parallel groove toward an end of the unit light guide plate. In another preferred embodiment, the pair of inclined faces is formed of a curved plane.

* * * * *